(12) United States Patent
Lin

(10) Patent No.: US 12,169,029 B2
(45) Date of Patent: Dec. 17, 2024

(54) INTEGRATED MULTI-PORT SOLENOID VALVE, VEHICLE THERMAL MANAGEMENT SYSTEM, AND VEHICLE

(71) Applicants: Zhejiang Liankong Technologies Co., Ltd, Ningbo (CN); Zhejiang Geely Holding Group Co., Ltd, Hangzhou (CN)

(72) Inventor: Bingrong Lin, Ningbo (CN)

(73) Assignees: Zhejiang Liankong Technologies Co., Ltd, Ningbo (CN); Zhejiang Geely Holding Group Co., Ltd, Hangzhou (CN)

( * ) Notice: Subject to any disclaimer, the term of this patent is extended or adjusted under 35 U.S.C. 154(b) by 51 days.

(21) Appl. No.: 18/000,682

(22) PCT Filed: Jun. 5, 2020

(86) PCT No.: PCT/CN2020/094774
§ 371 (c)(1),
(2) Date: Dec. 4, 2022

(87) PCT Pub. No.: WO2021/243721
PCT Pub. Date: Dec. 9, 2021

(65) Prior Publication Data
US 2023/0213108 A1 Jul. 6, 2023

(51) Int. Cl.
*F16K 27/00* (2006.01)
(52) U.S. Cl.
CPC .................................. *F16K 27/003* (2013.01)
(58) Field of Classification Search
CPC ........ F16K 11/22; F16K 11/24; F16K 27/003; F16K 27/10; Y10T 137/87885
See application file for complete search history.

(56) References Cited

U.S. PATENT DOCUMENTS 6,467,502 B1   10/2002  Johnson
6,834,669 B2 * 12/2004  Seyfarth ............. F15B 13/0814
                                                      137/884
(Continued)

FOREIGN PATENT DOCUMENTS

CN    101566244 A   10/2009
CN    203560516 U    4/2014
(Continued)

OTHER PUBLICATIONS

Machine English translation of EP1441160A2 (Year: 2024).*
(Continued)

*Primary Examiner* — Hailey K. Do
(74) *Attorney, Agent, or Firm* — Andrew C. Cheng

(57) ABSTRACT

An integrated multi-port solenoid valve, comprising: at least two sub-solenoid valves (20), each sub-solenoid valve (20) comprising at least two connection ports; and at least one first joint (30), each first joint (30) comprising at least two connection joints, wherein at least one first connection port in the at least two connection ports is used for connection to other sub-solenoid valves (20), each first joint (30) is used for connecting any two sub-solenoid valves (20), and each connector joint is connected to the first connection port. The present integrated multi-port solenoid valve integrates multiple sub-solenoid valves, and any connection ports of each sub-solenoid valve is communicated with each other to meet control requirements of a variety of working conditions. The integrated multi-port solenoid valve has lightweight design, few components, a light weight, and low cost of use. Also provided are a vehicle thermal management system and a vehicle.

20 Claims, 2 Drawing Sheets

(56) References Cited

U.S. PATENT DOCUMENTS

| | | | |
|---|---|---|---|
| 7,036,528 B2* | 5/2006 | Eidsmore | F16K 27/003 137/884 |
| 7,789,107 B2* | 9/2010 | Eriksson | F16K 27/003 137/884 |
| 8,291,935 B1* | 10/2012 | Merritt | F16K 27/003 137/897 |
| 9,347,577 B2 | 5/2016 | Peterson | |
| 9,850,920 B2 | 12/2017 | Inada | |
| 10,443,747 B2 | 10/2019 | Harris | |
| 2017/0198822 A1 | 7/2017 | Harris | |

FOREIGN PATENT DOCUMENTS

| | | | | |
|---|---|---|---|---|
| CN | 210118479 U | * | 2/2020 | |
| CN | 210178994 U | * | 3/2020 | B08B 13/00 |
| DE | 102018102542 A1 | | 8/2019 | |
| EP | 1441160 A2 | * | 7/2004 | B60H 1/00485 |
| JP | S49145216 U | | 12/1974 | |
| WO | 2013076768 A1 | | 5/2013 | |
| WO | WO-2020100751 A1 | * | 5/2020 | |

OTHER PUBLICATIONS

Espacenet machine English translation of CN210118479U (Year: 2024).*
Espacenet machine English translation of CN210178994U (Year: 2024).*
Machine English translation of WO2020/100751A1 (Year: 2024).*
The extended European search report of EP patent application No. 20939185.3 issued on Jan. 22, 2024.

* cited by examiner

INTEGRATED MULTI-PORT SOLENOID VALVE, VEHICLE THERMAL MANAGEMENT SYSTEM, AND VEHICLE

CROSS REFERENCE TO RELATED APPLICATIONS

The present disclosue is a 35 U.S.C. § 371 National Phase conversion of International (PCT) Patent Application No. PCT/CN2020/094774, filed on Jun. 5, 2020. The entire contents of the above-identified applications are incorporated herein by reference. The PCT International Patent Application was filed and published in Chinese.

TECHNICAL FIELD

The present disclosure relates to solenoid valves, in particular to an integrated multi-port solenoid valve, a vehicle thermal management system and a vehicle.

BACKGROUND

Electromagnetic valve is an industrial equipment controlled by electromagnetism. It is an automatic basic element used to control fluid, and belongs to actuator but not limited to be actuated by hydraulic or pneumatic. It is used in industrial control system to adjust direction, flow rate, speed and other parameters of the medium. The solenoid valve can cooperate with different circuits to achieve desired control, and the control accuracy and flexibility can be assured. There are many kinds of solenoid valves, with different solenoid valves playing different roles in different positions of the control system. The solenoid valves are most commonly used as one-way valves, safety valves, direction control valves, speed control valves, and etc.

Solenoid valves are widely used in vehicles. According to principle of the whole vehicle thermal management system, pure electric vehicles need to achieve the requirements of various working conditions through the solenoid valves. At present, three-way solenoid valves and four-way solenoid valves are commonly used in the listed vehicle models. However, with the increasing number of working conditions required by the whole vehicle thermal management system and the improvement of the requirements for control accuracy, the thermal management system built with three-way solenoid valve or four-way solenoid valve can no longer meet the requirements, and it is necessary to develop a multi-path solenoid valve that can be applied to multiple exchange loops.

SUMMARY

The technical problem to be solved by the present disclosure is that the number of the paths in the solenoid valve of the prior art cannot meet the working condition requirements of the vehicle heat exchange system.

To solve the above technical problems, in a first aspect, the embodiment of the present disclosure provides an integrated multi-port solenoid valve, which includes:
  at least two sub-solenoid valves, each of which includes
    at least two connection ports;
  at least one first joint, each of which includes at least two connection joints;
  the at least two connection ports include at least one first connection port for connecting with other sub-solenoid valves, the first joint is used for connecting any two of the sub-solenoid valves, and the connection joint is connected with the first connection port.

Furthermore, the integrated multi-port solenoid valve also includes a base, and any of the sub-solenoid valve is connected with the base.

Furthermore, the at least two connection ports also include a second connection port, the base is provided with a connection hole, and the second connection port is connected with the connection hole.

Furthermore, the integrated multi-port solenoid valve also includes a second joint, the second joint includes a first end and a second end, the first end is connected with the second connection port, and the second end is connected with the connection hole.

Furthermore, the number of the connection holes is greater than or equal to the number of the second joints.

Furthermore, the number of the connection holes is greater than the number of the second joints, the connection joint includes a first type of connection joint connected with the first connection portion and a second type of connection joint participated in constituting connection ports of the integrated multi-port solenoid valve, and at least one of the connection holes is connected with the second type of connection joint.

Furthermore, the number of the first joints is at least one less than that of the sub-solenoid valves.

Furthermore, the first joint is a two-way joint, a three-way joint or a four-way joint.

Furthermore, the sub-solenoid valve is a two-way solenoid valve, a three-way solenoid valve or a four-way solenoid valve.

Furthermore, the sub-solenoid valve is at least one of the direct acting solenoid valve, the step direct acting solenoid valve and the pilot solenoid valve.

Furthermore, the first end is connected with the second connection port by laser welding process.

Further, the second end is connected with the connection hole by hot plate welding process.

In a second aspect, the embodiment of the present disclosure provides a vehicle thermal management system, which includes the abovementioned integrated multi-port solenoid valve.

In a third aspect, the embodiment of the present disclosure provides a vehicle, which includes the abovementioned vehicle thermal management system.

With the above technical solutions, the integrated multi-port solenoid valve, the vehicle thermal management system and the vehicle described in the embodiment of the present disclosure have the following advantages:
  1) The integrated multi-port solenoid valve described in the embodiment of the present disclosure integrates a plurality of sub-solenoid valves, and any connection port of each sub-solenoid valve can be interconnected to meet the control requirements of various working conditions. The integrated multi-port solenoid valve has lightweight design, less components, light weight, and low cost of use;
  2) The integrated multi-port solenoid valve described in the embodiment of the present disclosure integrates multiple sub-solenoid valves on a base to form a highly integrated component, with highly integrated components, compact structural arrangement and convenient assembly and use. The connection joint and the connection port of the sub-solenoid valve are connected by laser welding process, and the connection joint and the base are connected by hot plate welding process, which solves the reliability problem of the integrated connection of multiple sub-solenoid valves in the prior art;

3) The vehicle thermal management system described in the embodiment of the present disclosure can meet the requirements of various working conditions by using integrated multi-port solenoid valves to build the system architecture, so that the vehicle thermal management system can have more functions, simple control structure, and meet more accurate control requirements. In addition, the use of integrated multi-port solenoid valve can simplify the pipeline system, reduce the number of pipelines, thus reducing the number of components used for pipeline connection and sealing, reducing costs, and facilitating maintenance.

BRIEF DESCRIPTION OF THE DRAWINGS

In order to illustrate the technical solutions of the present disclosure more clearly, the following will briefly introduce the accompanying drawings that are required to be used in the description of the embodiments. Obviously, the drawings in the following description are only some of the embodiments of the present disclosure, and for those of ordinary skill in the art, other drawings can also be obtained from these drawings without creative work.

The attached drawings are supplementally described as follows:

10—base; 101—connection hole; 20—sub-solenoid valve; 201—first three-way sub-solenoid valve; 202—second three-way sub-solenoid valve; 203—four-way sub-soleoid valve; 30—first joint; 40—second joint.

DETAILED DESCRIPTION OF PREFERRED EMBODIMENTS

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments of the present disclosure, all other embodiments obtained by those of ordinary skill in the art without creative work fall within the protection scope of the present disclosure.

Reference herein to "one embodiment" or "an embodiment" refers to a particular feature, structure, or characteristic that may be included in at least one implementation of the present disclosure. In the description of the present disclosure, it should be understood that the orientation or positional relationship indicated by terms "upper", "top", "bottom" and the like are based on the orientation or position relationship shown in the accompanying drawings, and is only for the convenience of description, rather than intended to indicate or imply that the device or element must have a particular orientation, be constructed and operate in a particular orientation, and therefore should not be construed as a limitation of the present disclosure. In addition, the terms "first" and "second" are only used for descriptive purposes, and should not be construed as indicating or implying relative importance or implying the number of indicated technical features. Thus, a feature defined as "first" and "second" may expressly or implicitly include one or more of that feature. Also, the terms "first," "second" and the like are used to distinguish similar objects, and are not necessarily used to describe a particular order or precedence. It is to be understood that the data so used may be interchanged under appropriate circumstances so that the embodiments of the present disclosure described herein can be practiced in sequences other than those illustrated or described herein.

According to the principle of the whole vehicle thermal management, pure electric vehicles need to achieve the requirements of various working conditions through solenoid valves. Three-way and four-way solenoid valves are commonly used in listed models. At present, in order to improve the endurance mileage of pure electric vehicles, the design of the vehicle thermal management system requires to adapt more and more working conditions. Nine-way and more-way solenoid valves appear to be more important.

Figure 1:
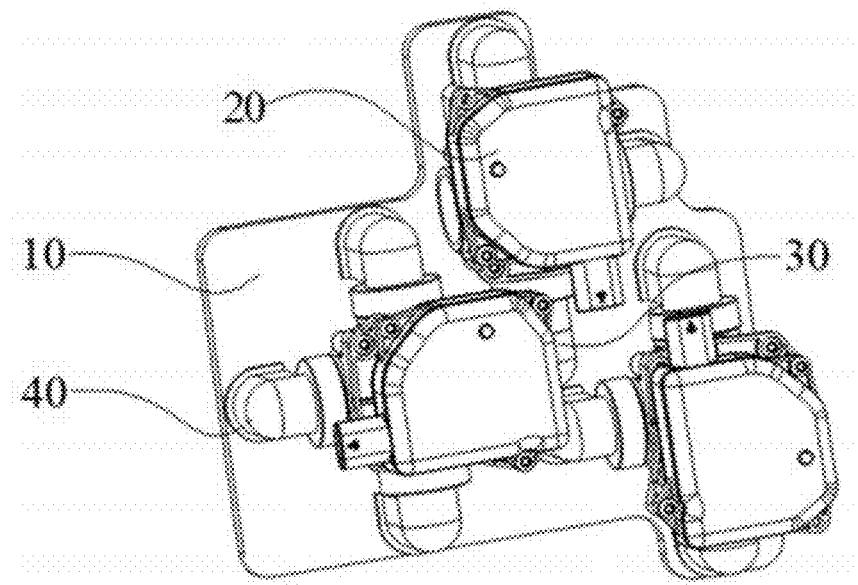
FIG. 1 is a schematic structural view of an integrated multi-port solenoid valve according to an embodiment of the present disclosure.

As shown in FIG. 1, the embodiment of the present disclosure discloses an integrated multi-port solenoid valve, which includes at least two sub-solenoid valves 20, each of which includes at least two connection ports; at least one first joint 30, and each first joint 30 includes at least two connection joints; the at least two connection ports includes at least one first connection port for communicating with other sub-solenoid valves 20, the first joint 30 is used for connecting any two sub-solenoid valves 20, and the connection joint is connected with the first connection port.

The integrated multi-port solenoid valve described in the embodiment of the present disclosure integrates multiple sub-solenoid valves 20 together, and any connection port of each sub-solenoid valve 20 can be interconnected to meet the control requirements of various working conditions, so that the integrated multi-port solenoid valve has lightweight design, less components, light weight, and low cost of use.

In the embodiment of the present disclosure, as shown in FIG. 1, a plurality of sub-solenoid valves 20 are connected in series to form an integrated multi-port solenoid valve by connection joints commonly used in pipeline connection. The sub-solenoid valve 20 constituting the multi-port solenoid valve is a common solenoid directional control valve widely used in the industrial technology. Each sub-solenoid valve 20 has at least two connection ports. Optionally, the sub-solenoid valve 20 can be a two-way solenoid valve, a three-way solenoid valve, a four-way solenoid valve, etc. The sub-solenoid valves 20 constituting the multi-port solenoid valve may have the same number of connection ports or have different number of connection ports. The connection ports of each sub-solenoid valve 20 may have two types. The first type of connection port is named as first connection port and used to connect with other sub-solenoid valves 20 in series, and each sub-solenoid valve has one or more first connection port. The second type of connection port is named as second connection port and used to connect pipeline. The second connection port constitutes the connection port of the multi-port solenoid valve. The first joint 30 is a commonly used connection joint in pipeline connection. Optionally, the first joint 30 may be two-way joint, a three-way joint, a four-way joint, or etc. The connection joints in the first joint 30 may also have two types. The first type of connection joint is used to connect with the first connection port, and the second type of connection joint participates in constituting the connection port of the multi-port solenoid valve. It should be noted that if there are more than two first connection ports in one sub-solenoid valve 20, the first type of connection joint in a single first joint 30 is only connected to one of the first connection ports, and there are at most one second type of connection joint in each first joint 30. The material of the sub-solenoid valve 20 in the embodiment of the present disclosure can be metal or plastic, and the sub-solenoid valves 20 constituting the multi-port solenoid valve can be made of different materials. The material of the first joint 30 can be metal or plastic, and the material of the first joint 30 can be the same as that of the sub-solenoid valve 20. For example, both the sub-solenoid valve 20 and the first joint 30 are metal. The material of the first joint 30 can be different from that of the sub-solenoid valve 20. For example, the sub-solenoid valve 20 is made of metal and the first joint 30 is made of plastic.

As shown in FIG. 1, the integrated multi-port solenoid valve also includes a base 10, and any of the sub-solenoid valves 20 is connected with the base 10.

In the embodiment of the present disclosure, the base 10 is a plate with a connection surface. The base 10 is used to integrate and fix the sub-solenoid valve 20, and the valve body of the sub-solenoid valve 20 is connected with the base 10. Optionally, the valve body of each sub-solenoid valve 20 is connected with the base 10. Optionally, the valve bodies of some of the sub-solenoid valves 20 are connected to the base 10.

The at least two connection ports also include a second connection port. A connection hole 101 is arranged on the base 10, and the second connection port is connected with the connection hole 101.

Figure 2:
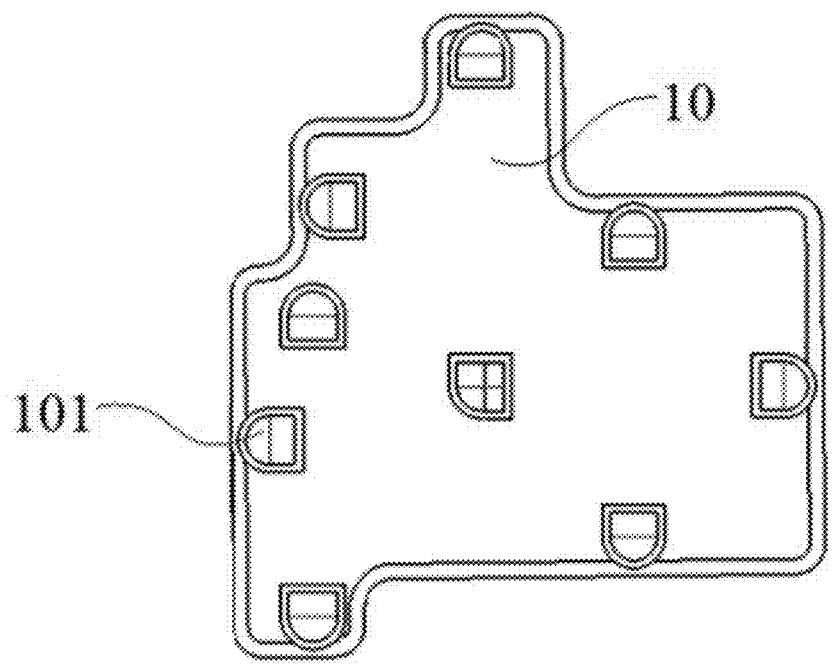
FIG. 2 is a schematic structural view of a base of an embodiment of the present disclosure.

In the embodiment of the present disclosure, as shown in FIG. 2, in order to further improve the integration degree of components of the multi-port solenoid valve and facilitate the installation and use of the multi-port solenoid valve, the connection ports of the multi-port solenoid valve are integrated on the base 10. The second connection port in the sub-solenoid valve 20 constitutes the connection port of the multi-port solenoid valve. Therefore, the base 10 is provided with a connection hole 101, and the second connection port of the sub-solenoid valve 20 is connected with the connection hole 101.

As shown in FIG. 1, the integrated multi-port solenoid valve also includes a second joint 40, the second joint 40 includes a first end and a second end, the first end is connected with the second connection port, and the second end is connected with the connection hole 101.

In the embodiment of the present disclosure, as shown in FIGS. 1 and 2, if the direction of the second connection port in the sub-solenoid valve 20 is parallel to the base 10, or spaces a distance from the base 10, the second joint 40 is used to connect the second connection port with the connection hole 101 of the base 10. The second joint 40 may usually be a two-way joint, and its material may be the same as or different from that of the sub-solenoid valve 20.

The number of connection holes 101 is greater than or equal to the number of second joints 40.

In the embodiment of the present disclosure, the connection ports of the integrated multi-port solenoid valve include the second connection port of the sub-solenoid valve 20 and the second type of connection joint of the first joint 30. That is, not all the connection holes 101 are connected with the second joint 40.

The number of connection holes 101 is greater than that of the second joint 40, and at least one connection hole 101 is connected with the second type of connection joint.

In the embodiment of the present disclosure, if the first joint 30 includes the second type of connection joint, that is, if the second type of connection joint participates in constituting the connection ports of the multi-port solenoid valve, part of the connection holes 101 can be directly connected with the second type of connection joint.

The number of first joints 30 is at least one less than the number of sub-solenoid valves 20.

In the embodiment of the present disclosure, the first joint 30 is used to connect the sub-solenoid valves 20 in series. If the sub-solenoid valve 20 includes more than two first connection ports, the first type of connection joint in one single first joint 30 is only connected with one of the first connection ports, so the number of the first joint 30 is less than the number of the sub-solenoid valves 20. For example, if the multi-port solenoid valve is composed of two sub-solenoid valves 20, only one first joint 30 is needed to connect the two sub-solenoid valves 20. If the multi-port solenoid valve is composed of more than two sub-solenoid valves 20, one or more first joints 30 are needed to connect all of the sub-solenoid valves 20. In general, the number of first joints 30 in the integrated multi-port solenoid valve depends on the number of sub-solenoid valves 20 and the number of connection joints in the first joint 30.

The first joint 30 may be a two-way joint, a three-way joint or a four-way joint.

In the embodiment of the present disclosure, in order to reduce the cost and improve universality of the components, the first joint 30 adopts two-way joint, three-way joint or four-way joint that are commonly used in the current pipeline connection.

The sub-solenoid valve 20 may be a two-way solenoid valve, a three-way solenoid valve or a four-way solenoid valve.

Figure 3:
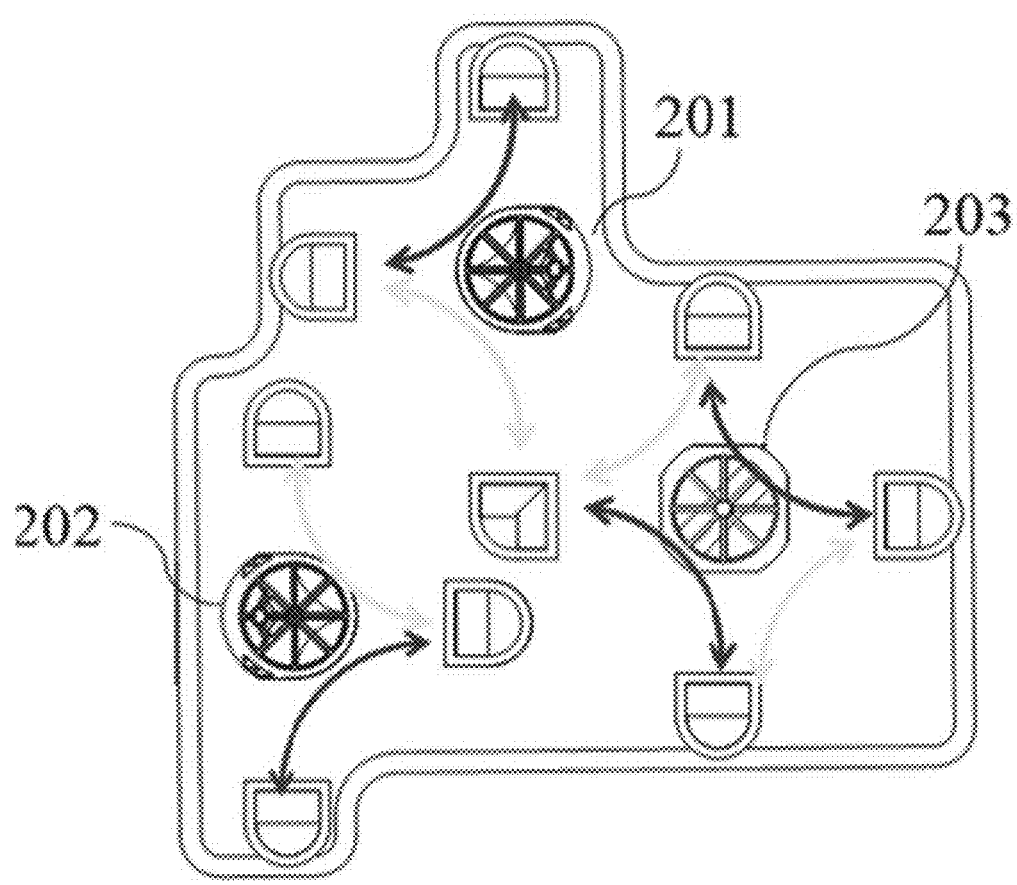
FIG. 3 is a schematic structural view of an integrated multi-port solenoid valve according to another embodiment of the present disclosure.

In the embodiment of the present disclosure, the sub-solenoid valve 20 adopts two-way solenoid valve, three-way solenoid valve or four-way solenoid valve that are commonly used in the market, and the required combination of the sub-solenoid valve 20 is determined by the final design requirements. For example, as shown in FIG. 2, the required multi-port solenoid valve is a nine-way solenoid valve, and a combination of two four-way sub-solenoid valves and one three-way sub-solenoid valve can be used. The three sub-solenoid valves 20 are connected by a four-way first joint 30, and one connection joint in the first joint 30 constitutes one connection port of the nine-way solenoid valve. Optionally, a combination of three four-way sub-solenoid valves can also be used, and the three sub-solenoid valves 20 are connected by a three-way first joint 30. Similarly, a ten-way, an eleven-way or more-way solenoid valve can also be realized by adopting different number of sub-electronic valve combinations and different number of connection ports. It should be noted that the implementation of the integrated multi-port solenoid valve is not limited to the above description. As shown in FIG. 3, in some embodiments, the base 10 may also be integrated with a sub-solenoid valve 20 which is not connected to other sub-solenoid valves 20 by the first joint 30, but is connected to other sub-solenoid valves 20 through one end of the connection surface of the base 10. For example, in the design of nine-way solenoid valve, a combination of one four-way sub-solenoid valve 203 and two three-way sub-solenoid valves 20 (i.e., a first three-way sub-solenoid valve 201 and a second three-way sub-solenoid valve 202) may also be used, as shown in FIG. 3, the first three-way sub-solenoid valve 201 and the four-way sub-solenoid valve 203 are connected through a three-way first joint 30, one connection joint in the first joint 30 constitutes one connection port of the nine-way solenoid valve, and the second three-way sub-solenoid valve 202 is individually connected with the base 10. When the nine-way solenoid valve is installed and used, the independent second three-way sub-solenoid valve 202 is connected with the four-way sub-solenoid valve 203 and the first three-way sub-solenoid valve 201 in the valve seat or pipeline system matching with the base 10. By controlling a motor to rotate the valve bodies of the two three-way sub-solenoid valves and the four-way sub-solenoid valve 203, the connectivity between the connection ports can be switched to meet the vehicle working conditions.

The sub-solenoid valve 20 may be at least one of the direct acting solenoid valve, the step direct acting solenoid valve and the pilot solenoid valve.

In the embodiment of the present disclosure, the sub-solenoid valves 20 constituting the multi-port solenoid valve may be solenoid valves of same type or solenoid valves of different types. For achieving of the unity and convenience of control, the sub-solenoid valves 20 are preferably the solenoid valves of same type.

The first end is connected with the second connection port by laser welding process. In the embodiment of the present disclosure, in the prior art, how to realize reliable connection between the connection ports of the solenoid valve is an urgent problem to be solved. The present disclosure adopts laser welding technology to realize the connection between the first joint 30 and the second joint 40 and the sub-solenoid valve 20. Laser welding can reduce the heat input to a minimum required amount, make the material transform range in the heat affection zone be small, and cause the deformation caused by heat conduction be the minimum. Laser welding does not require the use of electrodes, and there is no concern about electrode contamination or damage. Because laser welding is not a contact welding process, the wear and deformation of the machine can be minimized. The laser beam is easy to focus, align and be guided by optical instruments, and will not be limited by the welding space. At the same time, the laser beam is able to focus on a very small area, therefore could weld small and closely spaced components, could choose a wide range of welding materials, and could also join various heterogeneous materials. Moreover, it is easy to carry out high-speed welding automatically, and can also be controlled by digital or computer.

The second end is connected with the connection hole 101 by hot plate welding process.

In the embodiment of the present disclosure, the first joint 30, the second joint 40 and the base 10 are made of plastic materials, and the first joint 30, the second joint 40 and the base 10 can be connected by hot plate welding.

The embodiment of the present disclosure also discloses a vehicle thermal management system, which includes the integrated multi-port solenoid valve as described above.

In the embodiment of the present disclosure, the vehicle thermal management system includes an integrated multi-port solenoid valve. The structure of the integrated multi-port solenoid valve can be referred to all of the embodiments of the integrated multi-port solenoid valve described above. The multi-port solenoid valve can be designed to meet the requirements of multiple working conditions of the vehicle thermal management system of the present disclosure. By using integrated multi-port solenoid valve to build the system architecture, the vehicle thermal management system can have more functions, simplify the control structure, and meet more accurate control requirements. In addition, the use of integrated multi-port solenoid valve can simplify the pipeline system, reduce the number of pipelines, thus reducing the number of components used for pipeline connection and sealing, reducing costs, and facilitating maintenance.

The embodiment of the present disclosure also discloses a vehicle, which includes a vehicle thermal management system as described above.

In the embodiment of the present disclosure, for pure electric vehicles, the endurance mileage has always been a major factor limiting their development. For the vehicle described in the embodiment of the present disclosure, the integrated multi-port solenoid valve is used in the thermal management system, which can achieve a variety of energy-saving working conditions by designing corresponding control logic, so that the energy in the power battery can be more applied to the endurance mileage of the vehicle.

The above descriptions are only preferred embodiments of the present disclosure, and are not intended to limit the present disclosure. Any modification, equivalent replacement, improvement, and etc., made within the spirit and principles of the present disclosure shall be included in the protection scope of the present disclosure.

What is claimed is:

1. An integrated multi-port solenoid valve, comprising:
   at least two sub-solenoid valves, each of which comprising at least two connection ports;
   at least one first joint, each of which comprising at least two connection joints;
   wherein the at least two connection ports comprises at least one first connection port for connecting with other sub-solenoid valves, the at least one first joint is used for connecting any two of the at least two sub-solenoid valves, and at least one of the at least two connection joints is connected with the at least one first connection port;
   wherein the integrated multi-port solenoid valve comprises a base, and any of the at least two sub-solenoid valves is connected with the base;
   the at least two connection ports comprise at least one second connection port, the base is provided with at least one connection hole, and the at least one second connection port is connected with the at least one connection hole;
   the integrated multi-port solenoid valve comprises at least one second joint, each of the at least one second joint comprises a first end and a second end, the first end of the at least one second joint is connected with the at least one second connection port, and the second end of the at least one second joint is connected with the at least one connection hole;
   the number of the at least one connection hole is greater than or equal to the number of the at least one second joint.

2. The integrated multi-port solenoid valve according to claim 1, wherein a valve body of each of the at lease two sub-solenoid valves is connected with the base.

3. The integrated multi-port solenoid valve according to claim 1, wherein the integrated multi-port solenoid valve comprises one four-way sub-solenoid valve and two three-way sub-solenoid valves, one of the two three-way sub-solenoid valves is connected with the four-way sub-solenoid valve through a three-way first joint, one connection joint in the three-way first joint constitutes one connection port of the integrated multi-port solenoid valve, and the other of the two three-way sub-solenoid valves is individually connected with the base.

4. The integrated multi-port solenoid valve according to claim 1, wherein the number of the at least one connection hole is greater than the number of the at least one second joint, the at least two connection joints include a first type of connection joint connected with the first connection port and a second type of connection joint participated in constituting connection ports of the integrated multi-port solenoid valve, and at least one of the at least one connection hole is connected with the second type of connection joint.

5. The integrated multi-port solenoid valve according to claim 1, wherein the first end is connected with the at least one second connection port by a laser welding process.

6. The integrated multi-port solenoid valve according to claim 5, wherein the second end is connected with the at least one connection hole by a hot plate welding process.

7. The integrated multi-port solenoid valve according to claim 1, wherein the number of the at least one first joint is at least one less than the number of the at least two sub-solenoid valves.

8. The integrated multi-port solenoid valve according to claim 7, wherein the at least one first joint is a two-way joint, a three-way joint or a four-way joint.

9. The integrated multi-port solenoid valve according to claim 8, wherein the at least two sub-solenoid valves are two-way solenoid valves, three-way solenoid valves or four-way solenoid valves.

10. The integrated multi-port solenoid valve according to claim 9, wherein the type of the at least two sub-solenoid valves comprises at least one of a direct acting solenoid valve, a step direct acting solenoid valve and a pilot solenoid valve.

11. A vehicle thermal management system, wherein the vehicle thermal management system comprises an integrated multi-port solenoid valve comprising:
    at least two sub-solenoid valves, each of which comprising at least two connection ports;
    at least one first joint, each of which comprising at least two connection joints;
    wherein the at least two connection ports comprises at least one first connection port for connecting with other sub-solenoid valves, the at least one first joint is used for connecting any two of the at least two sub-solenoid valves, and at least one of the at least two connection joints is connected with the at least one first connection port;
    wherein the integrated multi-port solenoid valve comprises a base, and any of the at least two sub-solenoid valves is connected with the base;
    the at least two connection ports comprise at least one second connection port, the base is provided with at least one connection hole, and the at least one second connection port is connected with the at least one connection hole;
    the integrated multi-port solenoid valve comprises at least one second joint, each of the at least one second joint comprises a first end and a second end, the first end of the at least one second joint is connected with the at least one second connection port, and the second end of the at least one second joint is connected with the at least one connection hole;
    the number of the at least one connection hole is greater than or equal to the number of the at least one second joint.

12. The vehicle thermal management system according to claim 11, wherein the number of the at least one connection hole is greater than the number of the at least one second joint, the at least two connection joints include a first type of connection joint connected with the first connection port and a second type of connection joint participated in constituting connection ports of the integrated multi-port solenoid valve, and at least one of the at least one connection hole is connected with the second type of connection joint.

13. The vehicle thermal management system according to claim 11, wherein the number of the at least one first joint is at least one less than the number of the at least two sub-solenoid valves.

14. The vehicle thermal management system according to claim 11, wherein a valve body of each of the at least two sub-solenoid valves is connected with the base.

15. The vehicle thermal management system according to claim 11, wherein the integrated multi-port solenoid valve comprises one four-way sub-solenoid valve and two three-way sub-solenoid valves, one of the two three-way sub-solenoid valves is connected with the four-way sub-solenoid valve through a three-way first joint, one connection joint in the three-way first joint constitutes one connection port of the integrated multi-port solenoid valve, and the other of the two three-way sub-solenoid valves is individually connected with the base.

16. A vehicle, wherein the vehicle comprises a vehicle thermal management system comprising an integrated multi-port solenoid valve comprising:
    at least two sub-solenoid valves, each of which comprising at least two connection ports;
    at least one first joint, each of which comprising at least two connection joints;
    wherein the at least two connection ports comprises at least one first connection port for connecting with other sub-solenoid valves, the at least one first joint is used for connecting any two of the at least two sub-solenoid valves, and at least one of the at least two connection joints is connected with the at least one first connection port;
    wherein the integrated multi-port solenoid valve comprises a base, and any of the at least two sub-solenoid valves is connected with the base;
    the at least two connection ports comprise at least one second connection port, the base is provided with at least one connection hole, and the at least one second connection port is connected with the at least one connection hole;
    the integrated multi-port solenoid valve comprises at least one second joint, each of the at least one second joint comprises a first end and a second end, the first end of the at least one second joint is connected with the at least one second connection port, and the second end of the at least one second joint is connected with the at least one connection hole;
    the number of the at least one connection hole is greater than or equal to the number of the at least one second joint.

17. The vehicle according to claim 16, wherein the number of the at least one connection hole is greater than the number of the at least one second joint, the at least two connection joints include a first type of connection joint connected with the first connection port and a second type of connection joint participated in constituting connection ports of the integrated multi-port solenoid valve, and at least one of the at least one connection hole is connected with the second type of connection joint.

18. The vehicle according to claim 16, wherein the number of the at least one first joint is at least one less than the number of the at least two sub-solenoid valves.

19. The vehicle according to claim 16, wherein a valve body of each of the at least two sub-solenoid valves is connected with the base.

20. The vehicle according to claim 16, wherein the integrated multi-port solenoid valve comprises one four-way sub-solenoid valve and two three-way sub-solenoid valves, one of the two three-way sub-solenoid valves is connected with the four-way sub-solenoid valve through a three-way first joint, one connection joint in the three-way first joint constitutes one connection port of the integrated multi-port solenoid valve, and the other of the two three-way sub-solenoid valves is individually connected with the base.

* * * * *